United States Patent Office 2,831,029
Patented Apr. 15, 1958

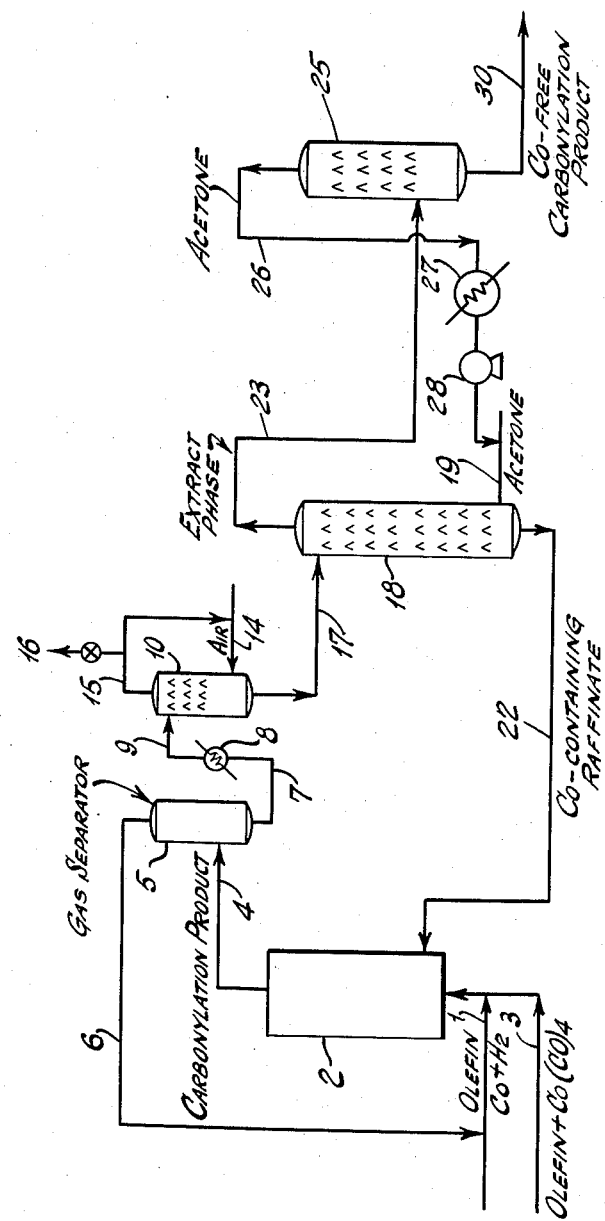

2,831,029
PROCESS FOR TREATING CARBONYLATION PRODUCT

Joseph H. Vergilio, Beacon, Frank H. Bruner, Fishkill, and Alfred J. Millendorf, Beacon, N. Y., assignors to The Texas Company, New York, N. Y., a corporation of Delaware Application December 24, 1953, Serial No. 400,254

12 Claims. (Cl. 260—604)

This invention relates to a process for freeing carbonylation product from its cobalt content. More particularly, this invention provides a solvent extraction process for effecting removal of cobalt from the product obtained by carbonylation of higher olefins.

One of the problems encountered in the carbonylation reaction, which involves the reaction of olefins with carbon monoxide and hydrogen to produce a reaction product comprising mainly aldehydes, ketones and alcohols, is the presence of cobalt metal in the reaction product in soluble form. Not only is the presence of the cobalt metal undesirable in the finished product, but its presence creates a serious operating problem since the soluble form of the cobalt is unstable and decomposes to cobalt metal during the isolation and recovery of the reaction product. The cobalt metal deposits in the pipes, stills and fractionating columns, necessitating the eventual shut-down of the recovery unit to remove the deposited cobalt metal.

Various procedures are employed to remove cobalt from the reaction product prior to its further treatment. In general, these procedures involve treating the reaction product in a cobalt decomposition zone under conditions conducive for decomposition of the soluble form of the cobalt to an insoluble form; in the insoluble form, the cobalt can be removed from the product by filtration or by passage through an adsorbent material. Conditions conducive for decomposition of soluble cobalt compounds are low partial pressure of carbon monoxide, temperatures higher than those employed in the carbonylation reaction, and pressures lower than those employed in the carbonylation reaction. The process of this invention provides a simple extraction procedure for removing cobalt metal from the product obtained by carbonylation of high molecular weight olefins.

In accordance with this invention, the carbonylation product of a $C_9$ or higher compound containing olefinic unsaturation is subjected to mild oxidation and the oxidized product is contacted with a low boiling solvent which is either a ketone or an ester with the resulting formation of a two-phase mixture. The upper phase of the mixture is a cobalt-free extract phase comprising solvent and a predominant portion of the reaction product. The denser raffinate phase contains substantially all of the cobalt content of the reaction product. Upon removal of the solvent from the extraction phase, there is obtained a mixture of aldehydes, alcohols, ketones and acids substantially free of cobalt. The raffinate phase contains a portion of the unreacted olefin and cobalt in a form which is readily converted to cobalt carbonyl under reaction conditions and is advantageously recycled to the carbonylation reaction. Contact of the carbonylation product with the low boiling ketone or ester solvent is advantageously effected in a countercurrent operation.

One of the important advantages of the process of this invention is that it effects removal of cobalt from a carbonylation product by a completely liquid phase operation, thereby by-passing the necessity of employing equipment for separating solids from liquids. The raffinate phase which retains the cobalt content of the reaction product in soluble form is simply separated from the extract phase. The process of the invention is readily adaptable to continuous operation employing countercurrent contact of the ketone or ester solvent and the carbonylation product.

Another important advantage of the process of the invention is that the cobalt in the raffinate phase is an excellent source of recycle catalyst for the carbonylation reaction. Since the cobalt in the raffinate phase is in a form which is readily converted to cobalt carbonyl or cobalt hydrocarbonyl under carbonylation conditions, the entire raffinate phase is recycled to the carbonylation reaction zone as a source of recycle catalyst. Recycle of the raffinate phase has the additional advantage of returning a portion of the unreacted olefin to the reaction zone.

Aliphatic compounds containing an olefinic bond react with carbon monoxide and hydrogen in the carbonylation reaction to yield a product comprising mainly aldehydes, alcohols, and ketones. The reaction conditions prescribed for the carbonylation reaction are well known and are broadly summarized as a temperature between about 50° and 210° C., a pressure between about 300 and 5,000 pounds per square inch gauge and the presence of a carbonyl compound of an eighth group metal, preferably cobalt. Cobalt carbonyl can either be preformed or produced in situ by the reaction of the carbon monoxide reactant with a cobalt salt of an organic or inorganic radical. Olefinic hydrocarbons are generally employed as the organic reactant, but a large number of substituted olefins can be employed as the charge material. Examples of substituted olefins that can be employed are hydroxy-substituted olefins, cyano-substituted olefins, carboxy-substituted olefins, carbalkoxy-substituted olefins, carbonyl-substituted olefins and aryl-substituted olefins.

The process of this invention is only applicable to a carbonylation product containing 10 or more carbon atoms which is obtained by the carbonylation of a $C_9$ or higher compound containing olefin unsaturation. It is not completely understood why a low boiling ketone or ester does not effect a sharp separation of an oxidized carbonylation product of lower olefins into a cobalt-free extract phase and a cobalt-containing raffinate phase. It is postulated that this phenomenon occurs with the oxidized carbonylation product of higher olefins because of the formation of a complex cobalt salt between a component of the oxidized higher molecular weight carbonylation product and cobalt carbonyl. Whatever be the explanation, it is noteworthy that the process of the invention is only applicable to carbonylation product of a $C_9$ or higher olefin.

It will be recognized, however, that the process is not limited to the carbonylation of $C_9$ and higher olefinic hydrocarbons, but is applicable to the product obtained by the carbonylation of $C_9$ and higher hydroxy-substituted olefins, cyano-substituted olefins, carboxy-substituted olefins, carbalkoxy-substituted olefins, carbonyl-substituted olefins, and aryl-substituted olefins. Examples of reactants which may be employed to produce a carbonylation product usable in the process of this invention are oleic acid, methyl oleate, oleyl nitrile, 4-hydroxy-decene-1, 4-n-hexenyl-n-octyl ketone and 4-hydroxy-1-dodecene.

The success of the extraction step in concentrating the cobalt in the raffinate phase is dependent on the mild oxidative pretreatment. It has been theorized that mild oxidation converts a portion of the carbonylation product to an organic acid, which then combines with the cobalt content of the reaction product to form a complex cobalt salt which insoluble in the ketone or ester solvent. Whatever be the mechanism, the mild oxidation step is absolutely essential to the success of the extraction process. In the absence of the mild oxidation, the extract phase has a pink color characteristic of soluble cobalt salts. In contrast, when the carbonylation product of $C_9$ and higher olefins is oxidized prior to the extraction, the extract phase is substantially water white.

Mild oxidation of the carbonylation product is effected by a variety of procedures which are recognized in the art as techniques for effecting mild oxidations of an oxygenated hydrocarbon mixture. The four most commonly used techniques are: air blowing, treating with a mild oxidizing agent, electrolytic oxidation and aging of the product in the presence of the carbonylation catalyst. The mild oxidation step, using any of these techniques, converts only a minor portion, less than 10 percent of the carbonylation product.

Air blowing is effected at a temperature below about 100° C. and is ideally suited for continuous operation because no extraneous materials are introduced into the carbonylation product. Air blowing is usually effected at a temperature between 30 and 90° C. and a rate of about 5–15 volumes of air per volume of product per hour at which rate substantially no entrainment of the high boiling reaction occurs. Of course, oxygen-enriched air or high purity oxygen can be employed in place of the air in the mild oxidation step; in the event that either of these two agents are used for the oxidation, the temperatures and gas rates are lower than those prescribed for air.

The desired mild oxidation is also effected with oxidizing agents such as hydrogen peroxide, urea peroxide, benzoyl peroxide, olefin peroxides, hypochlorites and iron salts. Oxidation with the chemical agents of this type is effected at temperatures up to about 50° C. and with very small concentrates of oxidizing agents. This procedure is normally not used in commercial operations because of the extra cost of chemical reagents.

Aging, involves allowing the reaction product containing dissolved cobalt salts to stand in contact with air for a period of at least five days. Sufficient oxidation occurs under these conditions so that the subsequent extraction with a ketone or an ester effects a clear-cut isolation of the cobalt content in the raffinate phase. This procedure is excellent for batch-type operation but is not feasible for continuous operation.

The fourth method for effecting mild oxidation involves passage of the product through an electrolytic cell. Electrolytic oxidation and air blowing are best suited for continuous commercial operation.

The solvents employed in the extraction step are broadly described as low boiling ketones and esters. Low boiling ketones and esters are compounds containing a maximum of seven carbon atoms. Examples of solvents which are employed in the process are acetone, methylethyl ketone, diethyl ketone, methyl isobutyl ketone, methyl-n-amyl ketone, methyl acetate, methyl butyrate, ethyl propionate, propyl acetate, ethyl pentanoate and butyl acetate.

The ketone or ester solvent is usually employed in an amount equal to 1 to 4 volumes of solvent per volume of carbonylation product. The broad volume ratio is defined as between 0.5 and 10 volumes of solvent per volume of product. It is possible to use larger amounts of solvent than prescribed, but such use only entails the handling of excess amounts of solvent.

Contact of the solvent with the oxidized carbonylation product is effected at temperatures and pressures which maintain substantially liquid phase conditions in the contact zone. Usually, atmospheric temperature and pressure are employed, but higher temperatures are feasible as long as substantially liquid phase conditions are maintained in the contact zone. If contact is effected under elevated pressures, the use of temperatures above atmospheric is feasible. Temperatures above 10° C. are recommended in order to maintain substantially liquid phase conditions in the contact zone; at temperatures below 10° C., the raffinate phase has a tendency to be at least partially solid.

One preferred modification of the invention involves effecting the contact at conditions approximately equivalent to that prevailing in the carbonylation reaction, that is, pressure between 1,000 and 3,000 p. s. i. g. and a temperature approximately equivalent to reaction conditions, that is, between 93 and 204° C. Operation at these conditions permits removal of the solvent from the extract phase by flashing.

Contact of the carbonylation product with the ketone or ester solvent is effected either batchwise or continuously. Continuous countercurrent operation is normally employed in large scale operation. The process of the invention is ideally adapted to countercurrent extraction operation wherein a downwardly flowing oxidized carbonylation product contacts an upwardly flowing solvent in an extraction tower. The lighter extract phase comprising solvent and a substantially cobalt-free product is removed from the upper part of the tower and the denser cobalt-containing raffinate is withdrawn from the bottom of the extract tower.

Cobalt-free carbonylation product is recovered from the extract phase by fractional distillation. As indicated previously, the solvent is removed from the extract phase by flashing if the process is effected at elevated temperature and pressure. The solvent-free product is usually a mixture of aldehydes, alcohols and acids; the order in which they are named indicates their concentration in the mixture. This mixture is ready for further treatment such as hydrogenation or oxidation to yield a predominantly alcoholic or acidic product, respectively.

The cobalt-containing raffinate phase constitutes less than about 5 percent of the total carbonylation product-solvent mixture. As indicated previously, the raffinate is usually recycled in toto to the carbonylation reaction zone to provide recycle catalyst and to return unreacted olefins.

In the accompanying drawing, there is diagrammatically shown how the process of the invention is employed as an integral part of a continuous carbonylation plant.

A $C_{12}$ olefin, carbon monoxide and hydrogen are introduced through a pipe into a reactor 2 maintained at conditions conducive for conversion of a high molecular weight olefin to a reaction product comprising mainly aldehydes and alcohols. These conditions are a temperature between 120 and 170° C., a pressure between 2,000 and 3,000 p. s. i. g. and a mol ratio of olefin, carbon monoxide and hydrogen of 1:2:2. Preformed make-up cobalt carbonyl dissolved in a portion of the olefin reactant is introduced through the pipe 3 into the reaction zone 2. During the passage through the reaction zone 2, the $C_{12}$ olefin is converted into a mixture comprising mainly aldehydes and alcohols containing 13 carbon atoms.

There is withdrawn from the upper portion of the reaction zone 2 through a pipe 4, an effluent comprising carbonylation product, unreacted charge olefin, cobalt in soluble form and unreacted carbon monoxide and hydrogen. This effluent is introduced into a gas-liquid separator 5 wherein separation of the carbon monoxide and hydrogen from the liquid reaction product is effected. Carbon monoxide and hydrogen are withdrawn from the upper portion of the separator 5 through a pipe 6 and are recycled to the reaction zone 2. The liquid reaction product is withdrawn from the separator 5 through a pipe 7, is cooled to a temperature of about 80° C. in an exchanger 8 and is then introduced into the upper portion of a contact tower 10 through a pipe 9. As the carbonylation product flows down through the tower 10, it is subjected to countercurrent contact with a stream of compressed air which is introduced into the lower portion of the tower 10 through a pipe 14. The air at a pressure of about 1500 p. s. i. g. is passed through the tower at a space velocity of 6 volumes of air per volume of product per hour. Contact with a carbonylation product by air under these conditions effects the desired oxidation of the reaction product.

Air is removed from contact zone 10 through a pipe 15 and is recycled therethrough to the contact zone. Means designated by the numeral 16 for venting a portion of the air are present in the recycle line 15.

The partially oxidized reaction product is withdrawn from the contact zone 10 through a pipe 17 and is introduced into the upper portion of a countercurrent extraction tower 18 which is maintained at a temperature of about 80° C. and at a pressure of about 1,500 p. s. i. g., which conditions are similar to those prevailing in the contact zone 10. Acetone is introduced into the lower portion of the tower 18 through a pipe 19 and contacts the downwardly flowing oxidized carbonylation product. As a result of the countercurrent contact of the oxidized carbonylation product and acetone in the tower 18, there is formed a two-phase system; the extract phase, which is substantially cobalt-free, comprises acetone, carbonylation product comprising mainly $C_{13}$ aldehyde and alcohol, a minor amount of acid and a portion of the unreacted olefin. The raffinate phase, which is of small volume and substantially denser than the extract phase, contains cobalt and a portion of the unreacted olefin.

The denser raffinate phase is withdrawn from the bottom of the extraction tower 18 through a pipe 22, and is recycled to the carbonylation reaction zone 2 wherein it serves as a source of recycle catalyst and of recycle olefin.

The extract phase is withdrawn from the top of the extraction tower 18 through a pipe 23 and is introduced into a flash tower 25 for removal of the acetone. On release of the pressure, the acetone is flashed from the carbonylation product in the tower 25 and is returned through the pipe 26 to the extraction tower 18. A heat exchange 27 and a compressor 28 in the line 26 are used to condense the acetone and recompress it to the pressure prevailing in the extraction tower 18.

The cobalt-free carbonylation product is withdrawn from the bottom of the flash tower 25 through a pipe 30 and is ready for further processing. If alcohols are the desired product of reaction, the cobalt-free carbonylation product is subjected to catalytic hydrogenation at conditions which are well known in the carbonylation art. If organic acids are the desired reaction product, the cobalt-free carbonylation product is subjected to oxidation at conditions which are also well described in the carbonylation art.

In the following examples, there are illustrated batchwise applications of the process of the invention to two different carbonylation products.

Example I

Hexadecylene in an amount of 338 g. (500 cc.) was reacted with a 1:1 $H_2$—CO mixture in the presence of 3.9 g. of preformed cobalt carbonyl. The carbonylation reaction was effected at a pressure between 2,200 and 2,900 p. s. i. g., at a mean temperature in the neighborhood of 146° C. and for a period of about 2½ hours. There was recovered 377 g. of product containing 0.86 weight percent cobalt. After this product had stood in contact with the atmosphere for over a week, 60 g. containing 0.52 g. of cobalt was mixed at room temperature and atmospheric pressure with 450 cc. (360 g.) of acetone with the resulting formation of a two-phase liquid system. The raffinate phase weighed 14.8 g. and was pink to purple in color, which is typical of cobalt compounds. The extract phase was water-white and weighed 405.2 g. Inspection of the extract phase showed that it was substantially free of cobalt. Inspection of the raffinate phase indicated that practically all of the cobalt originally present in the 60 g. of product had concentrated therein.

Example II

A $C_{23}$ olefin, a butylene copolymer mixture, sold commercially as Indopol L10, in an amount of 417 g. (550 cc.), was reacted with a 1:1 $H_2$—CO mixture in the presence of 4.2 g. of preformed cobalt carbonyl. The carbonylation reaction was effected at a mean temperature of about 150° C., at a pressure in the range of 2,580 to 3,160 p. s. i. g. and for a period of approximately 6 hours. From the reaction product which had stood in contact with the atmosphere for over a week, 60 g. of the reaction product containing 0.43 percent cobalt was taken and mixed at room temperature with 400 cc. of acetone with the resulting formation of a two-phase liquid system. The raffinate phase weighed 10.2 g. and analyzed 2.42 weight percent cobalt. On distillation of the acetone from the extract phase, there was recovered 50.1 g. of carbonylation product which analyzed 0.022 weight percent cobalt.

The foregoing examples clearly demonstrate that the process of the invention effects substantial removal of cobalt from the carbonylation product. The excellent results obtained in single stage batch contact in the preceding examples indicate that more thorough removal of cobalt from the carbonylation product is effected in multistage countercurrent extraction.

Obviously, many modifications and variations of the invention as hereinbefore set forth may be made without departing from the spirit and scope thereof, and, therefore, only such limitations should be imposed as are indicated in the appended claims.

We claim:

1. A process for removing cobalt from the prduct obtained by carbonylation of $C_9$ and higher compounds containing olefinic unsaturation with carbon monoxide and hydrogen which comprises subjecting said product to mild oxidation whereby a minor portion less than 10% of the carbonylation product is oxidized, contacting said oxidized product with a solvent selected from the group consisting of ketones and esters containing a maximum of 7 carbon atoms, said contact being effected at substantially liquid phase conditions and resulting in the formation of a two-phase system, an upper extract phase comprising said solvent and a major portion of said carbonylation product and a lower raffinate phase containing substantially all of the cobalt content of said product, and separating said extract phase from said raffinate phase.

2. A process according to claim 1 in which the carbonylation product is obtained by reaction of carbon monoxide and hydrogen with an olefinic hydrocarbon containing at least 9 carbon atoms.

3. A process according to claim 1 in which acetone is employed as the solvent.

4. A process according to claim 1 in which the solvent is employed in an amount of about 0.5 to 10 volumes of solvent per volume of said product.

5. A process according to claim 1 in which said separated raffinate phase is recycled to the carbonylation reaction.

6. A process according to claim 1 in which contact of said product with said low boiling solvent is effected countercurrently in an extraction tower.

7. A process according to claim 1 in which contact of said product with said low boiling solvent is effected at a temperature above 10° C.

8. A process according to claim 1 in which contact of said product with said low boiling solvent is effected at atmospheric temperature and pressure conditions.

9. A process according to claim 1 in which contact of said product with said low boiling solvent is effected at temperature and pressure conditions approximately equivalent to those prevailing in the carbonylation reaction.

10. A process according to claim 1, in which said mild oxidation of the carbonylation product is effected by air blowing.

11. A process according to claim 1, in which said mild oxidation of the carbonylation product is effected by aging of the product for a period of at least five days.

12. Process according to claim 1, in which said mild oxidation of the carbonylation is effected by passage through an electrolytic cell.

References Cited in the file of this patent

UNITED STATES PATENTS

| | | |
|---|---|---|
| 2,537,577 | Fasce et al. | Jan. 9, 1951 |
| 2,547,178 | Spence | Apr. 3, 1951 |
| 2,681,368 | Hale | June 15, 1954 |
| 2,686,206 | Cerveny | Aug. 10, 1954 |
| 2,757,204 | Ratcliff | July 31, 1956 |

OTHER REFERENCES

I. G. Farben patent application I 73, 291 IV d/120 O. Z. 13705, March 12, 1946, in Meyer Translation, PC–S–V, pages 62 and 63.